(12) United States Patent
Van Poecke

(10) Patent No.: US 11,761,416 B2
(45) Date of Patent: Sep. 19, 2023

(54) ENERGY STORAGE SYSTEM

(71) Applicant: Tree Energy Solutions B.V., Schiphol (NL)

(72) Inventor: Paulus Van Poecke, Brasschaat (BE)

(73) Assignee: Tree Energy Solutions B.V., Schiphol (NL)

( * ) Notice: Subject to any disclaimer, the term of this patent is extended or adjusted under 35 U.S.C. 154(b) by 0 days.

(21) Appl. No.: 17/554,361

(22) Filed: Dec. 17, 2021

(65) Prior Publication Data

US 2022/0195975 A1    Jun. 23, 2022

(30) Foreign Application Priority Data

Dec. 23, 2020 (NL) ........................... 2027210

(51) Int. Cl.
  *F03B 13/06* (2006.01)
  *F03D 9/14* (2016.01)
  *E02B 9/00* (2006.01)
  *F03B 17/00* (2006.01)

(52) U.S. Cl.
  CPC ............ *F03B 13/06* (2013.01); *F03D 9/14* (2016.05); *E02B 9/00* (2013.01); *F03B 17/005* (2013.01); *F05B 2240/95* (2013.01); *F05B 2260/42* (2013.01)

(58) Field of Classification Search
  CPC .......... F03B 13/06; F03B 17/005; F03D 9/14; E02B 9/00; F05B 2240/95; F05B 2260/42
  See application file for complete search history.

(56) References Cited

U.S. PATENT DOCUMENTS 5,389,821 A * 2/1995 Moulliet .................. E03F 7/00
                                                                290/43

FOREIGN PATENT DOCUMENTS

| DE | 69305724 T2 | 3/1997 | |
|---|---|---|---|
| DE | 102006003982 A1 | 8/2007 | |
| DE | 202012007767 U1 | 11/2012 | |
| DE | 102011105307 A1 * | 12/2012 | ............... E02B 9/00 |

(Continued)

OTHER PUBLICATIONS

Written Opinion for Dutch Application No. NL2027210 dated Sep. 2, 2021, with its English translation, 9 pages.

*Primary Examiner* — Viet P Nguyen
(74) *Attorney, Agent, or Firm* — Peter W. Schroen; Bret E. Field; Bozicevic, Field & Francis LLP

(57) ABSTRACT

Energy storage system comprising:
  a first tunnel shaft extending in an upright direction from a ground level to a predetermined underground level;
  an underground chamber at the predetermined underground level in the first tunnel shaft;
  a water reservoir is provided at the ground level
  a second tunnel shaft extending in a lying direction at the predetermined underground level, the second tunnel shaft forming a second water reservoir;
  at least one pipe extending through the first tunnel shaft interconnecting the first water reservoir and the second water reservoir for enabling water to flow between the ground level and the predetermined underground level; and
at least one electrical pump and at least one electrical turbine operationally connected to the at least one pipe to enable a controlled charging and discharging of the energy storage system by running an upward and a downward flow of water via the pumps and the turbines, respectively.

7 Claims, 3 Drawing Sheets

(56) References Cited

FOREIGN PATENT DOCUMENTS

Figure 1:
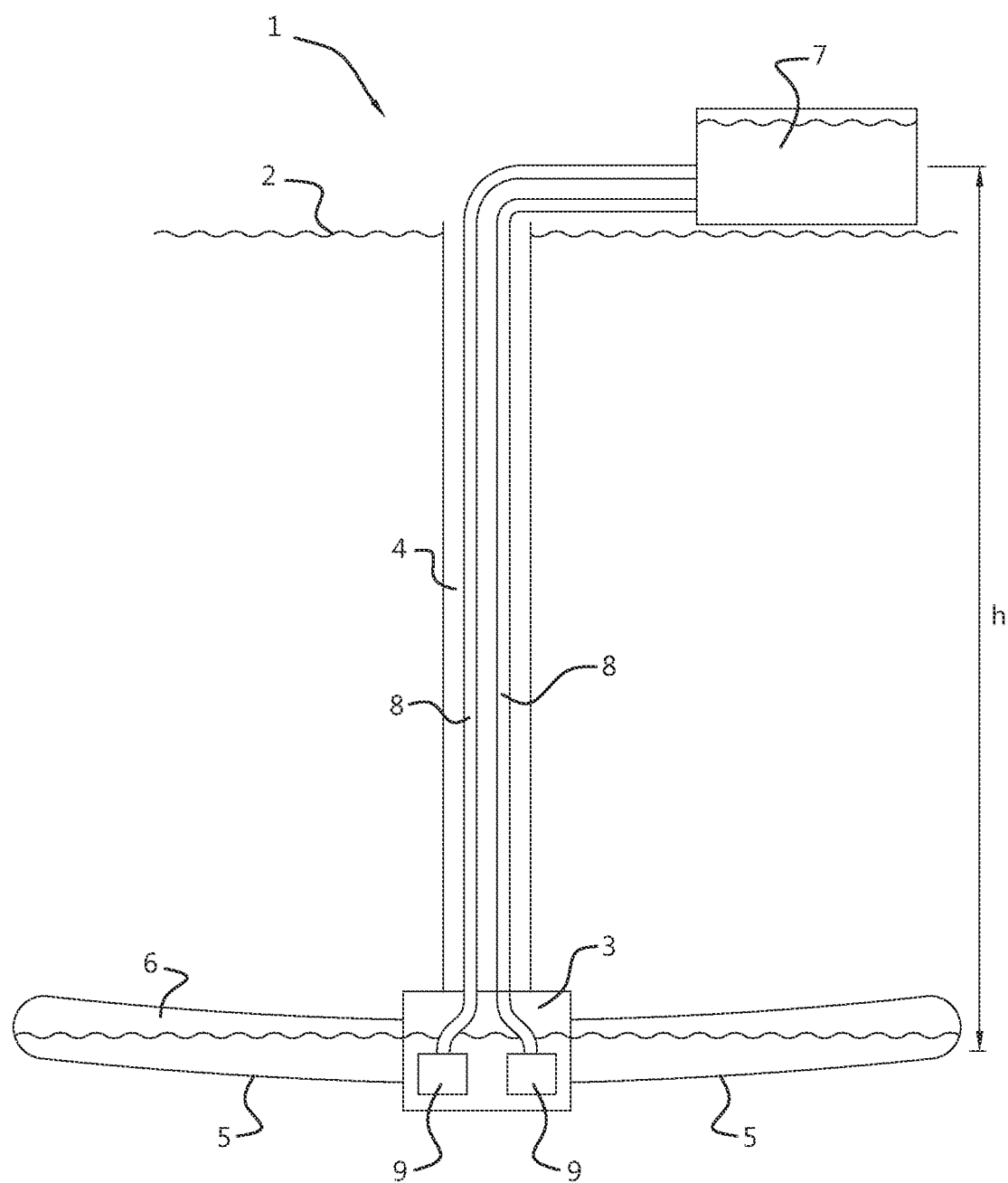

DE      102011107835 A1     1/2013
EP          2725143 A2     4/2014
WO    WO-2020146938 A1 *  7/2020  ............... B65G 5/00

* cited by examiner

ENERGY STORAGE SYSTEM

This invention relates to the storage of electrical energy, in particular to a method for constructing an energy storage system, to the energy storage system and to the use of the energy storage system.

The rate of generation of electricity cannot always readily be matched with demand. For example, if electricity is generated using solar energy, maximum electricity generation occurs on warm sunny days whereas during the night, no electricity is produced. A maximum electricity demand may occur when it is dark and/or cold. Similar problems are encountered with other forms of electricity generation, in particular other forms of generation such as wind or wave power where the rate of production of electricity can vary unpredictably. Even with conventional power stations which feed electricity into the national grid, electricity demand is much higher during the day than during the night. In an attempt to overcome these problems, various energy storage systems have been developed. The majority of these energy storage systems are battery based and therefore expensive and limited in scalability.

A hydropower energy storage system is also known as a hydroelectric energy storage system used in an electrical grid for load balancing. Such system stores energy in the form of gravitational potential energy of water, pumped from a lower elevation reservoir to a higher elevation. Low-cost surplus off-peak electric power is typically used to run the pumps. During periods of high electrical demand, the stored water is released through turbines to produce electric power. Although the losses of the pumping process make the plant a net consumer of energy overall, the system increases revenue by selling more electricity during periods of peak demand, when electricity prices are highest. Such storage systems can only be used if geographical circumstances allow or provide the lower and higher elevation reservoir, typically in the form of a lake. If the upper lake collects significant rainfall or is fed by a river then the plant may be a net energy producer in the manner of a traditional hydroelectric plant. An advantage of such energy storage systems is that it is reliable and scalable to high power and large capacities. The geographical constraints significantly reduce the application possibilities for such energy storage system.

Another type of pumped storage power plants are and methods for constructing them are known from WO2020/087882. This document describes to use underground space of abandoned mines to install a system to store electrical energy. A drawback of this system is the limited scalability and the application constraints being the requirement that there are abandoned mines with a suitable structure.

It is an object to propose a new energy storage system which is scalable and where less geographical constraints apply.

To this end the invention provides a method for constructing an energy storage system, the method comprising:
- digging a first tunnel shaft extending in an upright direction from a ground level to a predetermined underground level using a first tunnel boring machine;
- at the predetermined underground level in the first tunnel shaft, creating an underground chamber;
- providing a first water reservoir at the ground level;
- digging a second tunnel shaft as from the underground chamber using a second tunnel boring machine, the second tunnel shaft extending in a lying direction, the second tunnel shaft forming a second water reservoir;
- installing at least one pipe through the first tunnel shaft interconnecting the first water reservoir and the second water reservoir for enabling water to flow between the ground level and the predetermined underground level; and
- installing electrical pumps and turbines being operationally connected to the at least one pipe to enable a controlled charging and discharging of the energy storage system by running an upward and a downward flow of water via the pumps and the turbines, respectively.

The invention relates to a hydropower energy storage system and proposes to create an underground water reservoir using tunnel boring machines. In particular, the invention proposes to dig a first tunnel in an upright configuration, to a predetermined depth. This first tunnel functions as mine shaft. Tunnel boring technology in itself is known and forms part of the state of the art. With the current state of the art, vertical tunnels up to two kilometers deep may be dug with diameters up to 12 meters and more. At the bottom of the first tunnel, a second tunnel is dug. The second tunnel extends in a lying configuration and forms the underground water reservoir. With the current state of the art, lying tunnels with diameters up to 19 meters diameter may be dug. Lying tunnels are commonly used for underground metro, railway and roads. The length and diameter of the second tunnel determines the water capacity. The energy storage system proposed by the invention is scalable because a constructor may choose the diameters and lengths of the tunnels, and the number of tunnels used, thereby influencing the energy capacity of the energy storage system. Furthermore, there are significantly less geographical or environmental requirements compared to other energy storage systems using on hydropower.

Preferably, the step of digging the first tunnel shaft comprises removing ground material to create a first shaft and covering walls of the so-formed first shaft with a covering to create the first tunnel shaft. Further preferably, the step of digging the second tunnel shaft comprises removing ground material to create a second shaft and covering walls of the so-formed second shaft with a further covering to create the second tunnel shaft. Preferably, the further covering and optionally also the covering is substantially water-impermeable such that environmental ground water is prevented from entering. The covering, typically concrete-based covering, gives the tunnel shaft its strength. By adding additives in the concrete or providing other mechanism in or at the tunnel shaft covering, water infiltration from outside the tunnel can be minimized and therefore energy efficiency of the energy storage system may be optimized.

Preferably, the second tunnel shaft comprises at least one loop such that it starts at the underground chamber and that it ends at the underground chamber. The second tunnel forms the underground water reservoir. By forming the second tunnel shaft in the form of at least one loop starting and ending in the underground chamber, water can flow in and out of the second tunnel via the beginning and via the end of each loop, thereby providing a redundancy.

Preferably, the method comprises:
- before digging the second tunnel shaft, building a tunnel boring machine inside the underground chamber for digging the second tunnel shaft; and
- after digging the second tunnel shaft, dismantling and removing the tunnel boring machine from the underground chamber.

From a constructional point of view, forming the second tunnel shaft in the form of a loop has the additional advantage that the tunnel boring machine may be assembled at the bottom end of the first tunnel before starting digging the second tunnel and that the tunnel boring machine may be disassembled at the bottom end of the first tunnel after having dug the second tunnel.

Preferably, the second tunnel shaft comprises at least two loops, preferably at least three loops, more preferably at least four loops. The multiple loops enable water in the underground water reservoir, formed by the multiple loops, to flow into multiple directions at the same time thereby reducing water flow speed. Should the water only be able to flow into a single tunnel opening, the water flow speed would be significantly higher thereby reducing the efficiency and increasing the wear on the tunnel walls.

Preferably, the method further comprises performing maintenance on the tunnel boring machine in the underground chamber after it has finished boring a loop and before starting boring a subsequent loop.

From a constructional point of view, forming the second tunnel shaft with multiple loops has the additional advantage that maintenance may be performed on the tunnel boring machine at the bottom end of the first tunnel before starting digging the next loop. A further advantage relates to disposal of soil material by the tunnel boring machine. By providing multiple loops, the length of a single loop can be reduced thereby reducing also the distance over which soil material is to be transported.

Preferably, the installing of the electrical pumps and turbines comprises creating at least one intermediate level between the ground level and the predetermined underground level and installing at least one intermediate pump and at least one intermediate turbine at the at least one intermediate level.

Intermediate levels may be provided if and where necessary based on the characteristics and constraints of the pumps and turbines. Working properties of pumps and turbines comprise optimal pumping pressures and turbine operating pressures. These optimal pressures may be taken into account in determining a vertical distance between subsequent pumps and turbines. Water height is directly related to water pressure so that optimal pumping pressures and turbine operating pressures may determine optimal height intervals for the pumps and turbines.

The invention further relates to an energy storage system comprising:
 a first tunnel shaft extending in an upright direction from a ground level to a predetermined underground level;
 an underground chamber at the predetermined underground level in the first tunnel shaft;
 a water reservoir is provided at the ground level
 a second tunnel shaft extending in a lying direction at the predetermined underground level, the second tunnel shaft forming a second water reservoir;
 at least one pipe extending through the first tunnel shaft interconnecting the first water reservoir and the second water reservoir for enabling water to flow between the ground level and the predetermined underground level; and
 at least one electrical pump and at least one electrical turbine operationally connected to the at least one pipe to enable a controlled charging and discharging of the energy storage system by running an upward and a downward flow of water via the pumps and the turbines, respectively.

The energy storage system of the invention provides a scalable energy storage solution because a constructor may choose the diameters and lengths of the tunnels. The diameters and lengths of the tunnels directly influence the energy capacity of the energy storage system. Furthermore, at the ground level, the impact for the environment is minimal. At the ground level, a water reservoir and a tunnel opening of the first tunnel shaft is required. The majority of the energy storage system is built deep below the ground surface and therefore has a negligible impact on the above ground environment.

Preferably, the predetermined underground level is at least 500 meters below the ground level, preferably at least 1000 meters below the ground level, more preferably at least 1500 meters below the ground level, most preferably about 2000 meters below the ground level. Calculations have shown that such depths allow to make the energy storage system economically profitable. It will be clear that larger depths may also be adopted. Depending on the geological circumstances, the first tunnel shaft may be made with a length up to 4 kilometers. This would equally bring the predetermined underground level about 4000 meters below the ground level.

Preferably, walls of the second tunnel shaft and optionally also walls of the first tunnel shaft comprise a substantially water-impermeable covering such that environmental ground water is prevented from entering the shafts. The impermeability also provides a safety barrier to water from the energy storage system to exit the shafts in the unlikely event of leakage. The covering, typically concrete-based, gives the tunnel shaft its strength. By adding additives in the concrete or providing other mechanisms in or at the tunnel shaft covering, the tunnel shaft may be made substantially water-impermeable and therefore energy efficiency of the energy storage system may be optimized.

Preferably, the first tunnel shaft has a diameter of at least 4 meters, preferably of at least 7 meters, more preferably of at least 10 meters. Preferably, the second tunnel shaft has a diameter of at least 6 meters, preferably of at least 10 meters, more preferably of at least 14 meters, most preferably of at least 18 meters. Preferably, the second tunnel shaft has a length of at least 3 kilometers, preferably of at least 6 kilometers, more preferably of at least 9 kilometers, most preferably of at least 12 kilometers. Calculations have shown that such dimensions allow to make the energy storage system economically profitable.

Preferably, the second tunnel shaft comprises multiple segments, each segment being formed as a loop starting and ending at the underground chamber. The multiple loops enable water in the underground water reservoir to flow into multiple directions at the same time thereby reducing overall water flow speed for a given flow rate. Should the water only be able to flow into a single tunnel opening, the water flow speed would be significantly higher for the same flow rate thereby reducing the efficiency and increasing the wear on the tunnel walls. From a constructional point of view, forming the second tunnel shaft with multiple loops has an additional advantage that is explained above.

The invention further relates to a use of an energy storage system according to the invention including charging and discharging electrical energy to/from the energy storage system by running an upward and a downward flow of water via the pumps and the turbines, respectively.

Figure 2:
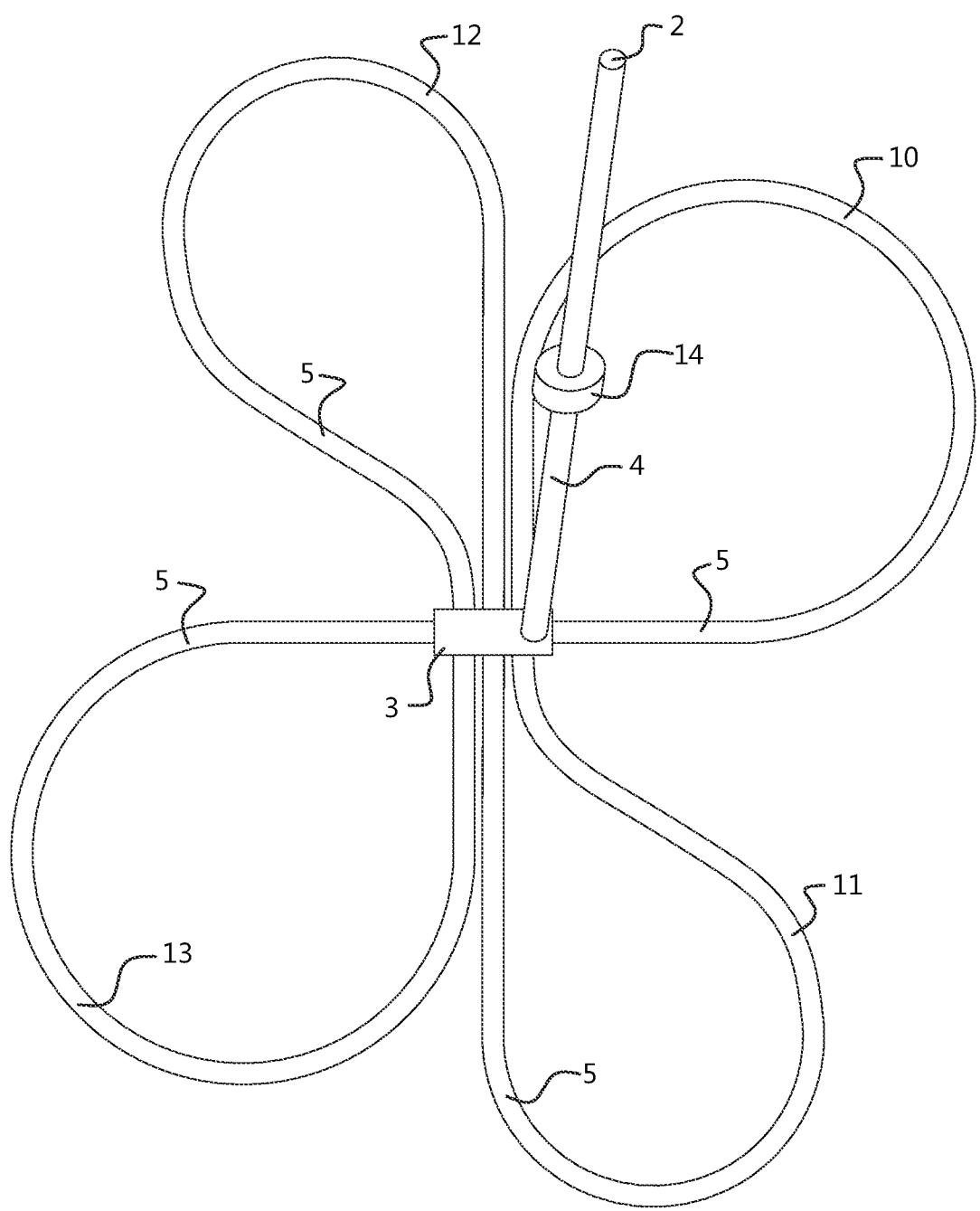
Figure 3:
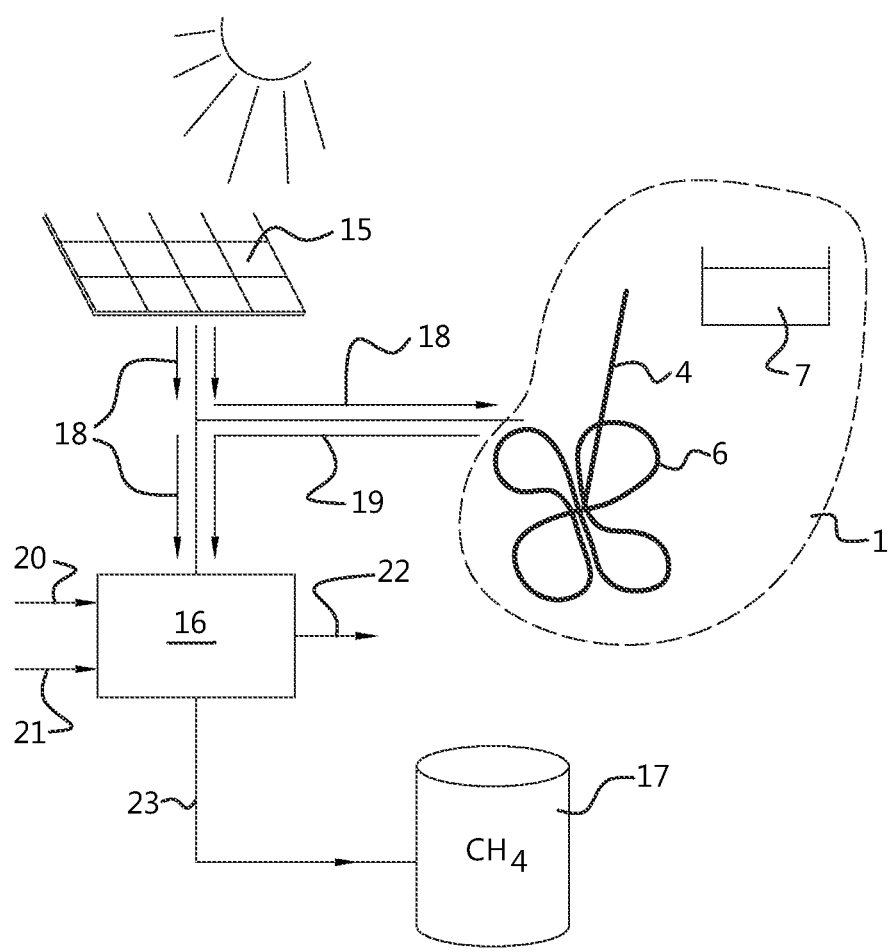

The invention will now be described in more details with respect to the drawings illustrating some preferred embodiments of the invention. In the drawings:

FIG. 1 a schematic view of the energy storage system of an embodiment of the invention;

FIG. 2 a schematic perspective view of the energy storage system of an embodiment of the invention; and FIG. 3 a preferred use case for the energy storage system of an embodiment of the invention.

In the drawings a same reference number has been allocated to a same or analogous element.

A tunnel boring machine is defined as a mechanical equipment assisting workmen to create a tunnel. According to a broad interpretation, any digging assisting equipment such as a shovel and dynamite may be regarded as a tunnel boring machine. Preferably, a tunnel boring machine is a dedicated installation designed to remove and discharge soil in a controlled manner to create a hole with a predetermined diameter. Tunnel boring machines for drilling vertical shafts are described for example in WO2017/133986. Preferably the tunnel boring machine is equipped with a tunnel wall building section to reinforce the walls of the tunnel. Such tunnel wall building section is described in WO2011/085734. Tunnel boring machines for drilling horizontal shafts are well known and described in for example WO92/18751. Because tunnel boring machines are known in the art, no further description of these machines is given in this text. The tunnel shafts described hereunder and shown in the figures can be formed using known tunnel boring machines.

FIG. 1 shows a schematic side view of an energy storage system 1 according to an embodiment of the invention. The energy storage system 1 comprises a first tunnel shaft 4 extending from a ground level 2 to an underground chamber 3 located at a predetermined underground level. The first tunnel shaft 4 is created with a tunnel boring machine and extends substantially vertical. Walls of the first tunnel shaft 4 are preferably reinforced, for example with a concrete-based reinforcement. Preferably, the walls are substantially water-impermeable to prevent environmental water which might be present in the soil from penetrating the first tunnel shaft 4. The first tunnel shaft 4 preferably has a diameter of at least 4 meters, preferably of at least 7 meters, more preferably of at least 10 meters. The first tunnel shaft 4 preferably has a length or depth of at least 500 meters, preferably at least 1000 meters, more preferably at least 1500 meters and most preferably about 2000 meters. The underground chamber 3 is located at or near a bottom end of the first tunnel shaft 4.

The energy storage system 1 comprises a second tunnel shaft 5. The second tunnel shaft 5 extends as from the underground chamber 3 in a substantially horizontal direction. The second tunnel shaft 4 is preferably created with a second tunnel boring machine and extends substantially horizontal. Preferably, the second tunnel shaft 5 is oriented in a draining manner towards the underground chamber 3 meaning that water in the second tunnel shaft 5 has a tendency to flow towards the underground chamber 3. In other words, the floor surface of the underground chamber constitutes the lowest point in the energy storage system 1 and the level of the floor surface of the second tunnel shaft 5 slightly increases relative to the level of the floor surface of the underground chamber in a direction away from the underground chamber 3.

In the context of this description, a textual difference is introduced to describe the first and the second tunnel boring machine. In the description, the term first boring machine is used to address the machine used to create the first tunnel shaft 4. The term second boring machine is used to address the machine used to create the second tunnel shaft 5. Although in one preferred embodiment, these machines constitute physically different installations, there may be alternative preferred embodiments wherein a single machine is created that is operable to dig a vertical shaft in a first operating mode and to dig a horizontal shaft in a second operating mode. It will be clear that the terms first and second boring machine are not intended to exclude such alternative preferred embodiment.

Walls of the second tunnel shaft 5 are preferably reinforced, for example with a concrete-based reinforcement. Preferably, the walls are substantially water-impermeable to prevent environmental water which might be present in the soil from penetrating the second tunnel shaft 5. The second tunnel shaft 5 preferably has a diameter of at least 6 meters, preferably of at least 10 meters, more preferably of at least 14 meters, most preferably of at least 18 meter. The second tunnel shaft 5 preferably has a length of at least 3 kilometers, preferably of at least 6 kilometers, more preferably of at least 9 kilometers, most preferably of at least 12 kilometers.

At the ground level 2, a first water reservoir 7 is provided. The second tunnel shaft 5 and the underground chamber 3 form a second water reservoir 6 in the energy storage system 1. The way of constructing the first water reservoir 7 may differ. In an embodiment, the first water reservoir 7 may be built as a pool which is optionally covered with a roof. Alternatively, the first water reservoir 7 is built as a liquid storage tank. Further alternatively, the first water reservoir 7 is formed by a river or lake close to the upper end of the first tunnel shaft 4. In any case, the first water reservoir 7 should be able to contain or provide to the energy storage system 1 an amount of water which at least corresponds to the water capacity of the second water reservoir 6.

The first tunnel shaft 4 is provided with one or more pipes 8 interconnecting the first water reservoir 7 and the second water reservoir 6. Pumps and turbines 9 are provided to displace water in a controlled manner between the first water reservoir 7 and the second water reservoir 6. Pumps and turbines 9 can be provided as separate elements and connected via valves with the pipes 8. Alternatively, pumps are used which can be used as turbines or pumps depending on how the pumps are used, analogue to electric motor/generators. In the further description, reference is made to pump/turbines 9 which may be embodied as one element or as two elements as the skilled person will understand.

Each pump/turbine 9 is connected to an electromotor/generator (not shown). The skilled person will understand that electric energy can be used to pump water from the second water reservoir 6 to the first water reservoir 7. Also, electric energy can be generated by allowing water to flow down from the first water reservoir 7 to the second water reservoir 6. The principles of hydropower energy storage system, where energy is stored in the form of gravitational potential energy of water, pumped from a lower elevation reservoir to a higher elevation reservoir, are known and therefore not explained in more detail in this description. Energy may be charged by the energy storage system 1 by pumping water out of the second water reservoir 6 and into the first water reservoir 7. Energy may be discharged by the energy storage system 2 by using turbines 9 to generate power when water flows from the first water reservoir 7 to the second water reservoir 6. It is noted that the energy storage system 1 of the invention can be built using known and approved technology, and can be operated without rare earth materials. Therefore the energy storage system 1 provides a reliable and environmentally friendly solution for storing large amounts of energy. Calculations have shown that energy amounts up to 1500 MWh may be stored in the energy storage system 1. This means that during daytime, on 12 hours, about 1500 MWh can be charged into the energy storage system 1 while during the night, on a subsequent 12 hours, about 1400 MWh can be discharged from the energy storage system. The skilled person will realize that there is a loss of efficiency between charging and discharging such that the charged amount and the discharged amount is not equal.

An additional advantage during the charging of the energy storage system 1 is that the water in the second water reservoir 6, depending on the depth of the second water reservoir 6, may be warm. Due to earth warmth, the water may have warmed to about 50 degrees. This warmth may be used in secondary processes, for example in an industrial process or in a collective city heating system.

FIG. 2 shows a perspective view of the tunnel shafts of the energy storage system 1 of an embodiment of the invention. FIG. 2 shows how the first tunnel shaft 4 extends between the ground level 2 and an underground chamber 3 located at a predetermined depth. In the embodiment of FIG. 2, an intermediate level is shown in the first tunnel shaft 4. In practice, one or multiple intermediate levels may be provided to install additional pumps/turbines to bridge the vertical distance between the first water reservoir 7 and the second water reservoir 6 in an optimal way. The skilled person understands that multiple pumps/turbines can be cascaded in the pipe 8 to optimize the water flow through the pipe 8.

The underground chamber 3 is provided, during construction of the energy storage system, for building a tunnel boring machine adapted to dig the second tunnel shaft 5. The underground chamber 3 may, after construction of the energy storage system has completed, serve as a machine room for installing pumps/turbines 9, electric motors/generators, piping systems, filters and other systems for operating and controlling operation and maintenance of the energy storage system 1.

The second tunnel shaft 5 is preferably formed with multiple loops 10, 11, 12, and 13, as is shown in FIG. 2. The underground chamber 3 preferably forms the junction between the multiple loops. Each loop starts and ends at the underground chamber 3, as is shown in FIG. 2. The radius of the bend in the loop may depend on multiple factors including the optimal or maximum bending radius of the tunnel boring machine and on soil properties. The loops lay substantially horizontal with an upward deflection towards the most remote parts of the loop, meaning the parts furthest away from the underground chamber 3. This orientation of the loops guarantees that water in the loops flows towards the underground chamber 3.

FIG. 2 shows a preferred configuration of four loops 10, 11, 12 and 13 wherein the end of each loop is oriented in line with the start of the next loop. The orientation of the end of the final loop is in line with the orientation of the start of the first loop. This allows a tunnel boring machine to be built up in the underground chamber in a predetermined location and orientation before starting drilling or digging of the first loop 10 of the second tunnel shaft 5 and allows the tunnel boring machine to be disassembled in the same predetermined location and orientation after ending drilling or digging of the fourth loop 13. This facilitates construction of the second tunnel shaft 5.

The energy storage system 1 comprises a first water reservoir 7 at the ground level 2. It is noted that this does not exclude the first water reservoir 7 to be covered with a layer of soil. Any water reservoir 7 that is formed in a proximity of or near the ground level 2 is considered a first water reservoir 7 at the ground level 2. In an embodiment, the first water reservoir 7 is formed in an analogue way as the second water reservoir 6, using a lying tunnel (not shown) dug in the ground at a height close to the ground level 2. Such lying tunnel would still be considered a first water reservoir 7 at the ground level 2. Such lying tunnel may be formed less than 100 meters form the ground level 2, preferably less than 50 meters from the ground level. Water reservoirs formed at such shallow depths are considered formed at the ground level 2.

FIG. 3 shows an energy production plant wherein the energy storage system 1 of the invention is used to optimize the energy output of the production plant. The energy production plant comprises a solar energy production system 15. The energy from the solar energy production system 15 is used by an electrolyzing installation 16. The electrolyzing installation 16 is preferably of the type where energy is used to transform water 20 and carbon dioxide 21 into oxygen 22 and methane 23. The methane 23 may be stored in a storage tank 17. Such energy production plant can be installed in an environment reasonably close to the equator so that a year-round stable yield is obtained from the solar energy production system 15. The so-produced methane from the storage tank 17 may be transported, for example shipped, to remote locations where it is used as fuel. Alternatively, the methane is locally used or is transported via a pipeline to another location for further use. In an optimal situation, carbon dioxide is captured at the remote location and transported back to the electrolyzing installation 16 to be fed back into the installation 16 as shown with arrow 21. In this way, a circular energy system based on green energy is realized.

The energy storage system 1 enables the energy production plant of FIG. 3 to operate in an optimal way. For an optimal operation, the electrolyzing installation 16 should be able to work twenty-four hours a day. However, a solar energy production system only generates electrical energy when the sun shines, so on average about twelve hours a day, hereafter referred to as daytime. The energy storage system 1 is preferably dimensioned to store the amount of energy required to operate the electrolyzing installation 16 during the hours when the solar energy production is low or zero, hereafter referred to as nighttime. This means that the solar energy production system 15 is dimensioned to generate the energy required to operate the electrolyzing installation 16 and to charge the energy storage system 1 during daytime. In other words, the maximum power of the solar energy production system 15 is about twice the maximum power of the electrolyzing installation 16. During daytime, the energy flows as shown in FIG. 3 with arrows 18. One part of the energy from the solar energy production system 15 runs directly to the electrolyzing installation 16. Another part of the energy from the solar energy production system 15 runs to the energy storage system 1 for charging the latter. During nighttime, the energy flows as shown in FIG. 3 with arrow 19. During nighttime, the electrolyzing installation 16 is operated using power from the energy storage system 1. Such setup allows to operate the electrolyzing installation 16 twenty-four hours a day using energy captured from the sun.

The preferred use-case shown in FIG. 3 is merely one of a multitude of possibilities of use of the energy storage system 1 of the invention. The use-case of FIG. 3 proposes an industrial use of the system 1 in an energy production plant. Other use-cases may relate to more urban use or mixed use of the system 1. Because the extent and environmental impact of the system at the ground level is limited, it is possible to install such energy storage system 1 close to a city center. It is known that the energy demand in a city fluctuates and that the green energy production fluctuates. To match production and demand, the energy storage system 1 of the invention may be used. As described above, such urban use of the energy storage system 1 may have the additional advantage that warmth of water pumped up from the second water reservoir 6 may be used in secondary processes, for example city heating system.

The skilled person will appreciate on the basis of the above description that the invention can be embodied in different ways and on the basis of different principles. The invention is not limited to the above described embodiments. The above described embodiments and the figures are purely illustrative and serve only to increase understanding of the invention. The invention will not therefore be limited to the embodiments described herein, but is defined in the claims.

The invention claimed is:

1. An energy storage system comprising:
    a first tunnel shaft extending in an upright direction from a ground level to a predetermined underground level;
    an underground chamber at the predetermined underground level in the first tunnel shaft;
    a water reservoir is provided at the ground level;
    a second tunnel shaft extending in a lying direction at the predetermined underground level, the second tunnel shaft forming a second water reservoir, wherein the second tunnel shaft comprises at least one segment, each segment being formed as a loop starting and ending at the underground chamber, wherein the second tunnel shaft comprises multiple segments, each segment being formed as a loop starting and ending at the underground chamber;
    at least one pipe extending through the first tunnel shaft interconnecting the first water reservoir and the second water reservoir for enabling water to flow between the ground level and the predetermined underground level; and
    at least one electrical pump and at least one electrical turbine operationally connected to the at least one pipe to enable a controlled charging and discharging of the energy storage system by running an upward and a downward flow of water via the pumps and the turbines, respectively.

2. The energy storage system according to claim 1, wherein the predetermined underground level is at least 500 meters below the ground level.

3. The energy storage system according to claim 1, wherein walls of the second tunnel shaft comprise a substantially water-impermeable covering such that environmental ground water is prevented from entering.

4. The energy storage system according to claim 1, wherein the first tunnel shaft has a diameter of at least 4 meters.

5. The energy storage system according to claim 1, wherein the second tunnel shaft has a diameter of at least 6 meters.

6. The energy storage system according to claim 1, wherein the second tunnel shaft has a length of at least 3 kilometers.

7. The energy storage system according to claim 1, wherein the first tunnel shaft comprises a substantially water-impermeable covering such that environmental ground water is prevented from entering.

* * * * *